United States Patent
Lee et al.

(10) Patent No.: US 11,411,325 B2
(45) Date of Patent: Aug. 9, 2022

(54) OAM MULTIPLEXING COMMUNICATION SYSTEM AND OAM MULTIPLEXING COMMUNICATION METHOD

(71) Applicant: NIPPON TELEGRAPH AND TELEPHONE CORPORATION, Tokyo (JP)

(72) Inventors: Doohwan Lee, Yokosuka (JP); Hirofumi Sasaki, Yokosuka (JP); Hiroyuki Fukumoto, Yokosuka (JP); Hiroyuki Shiba, Yokosuka (JP)

(73) Assignee: NIPPON TELEGRAPH AND TELEPHONE CORPORATION, Tokyo (JP)

(*) Notice: Subject to any disclaimer, the term of this patent is extended or adjusted under 35 U.S.C. 154(b) by 329 days.

(21) Appl. No.: 16/649,910

(22) PCT Filed: Sep. 25, 2018

(86) PCT No.: PCT/JP2018/035536
§ 371 (c)(1),
(2) Date: Mar. 23, 2020

(87) PCT Pub. No.: WO2019/059407
PCT Pub. Date: Mar. 28, 2019

(65) Prior Publication Data
US 2020/0313307 A1    Oct. 1, 2020

(30) Foreign Application Priority Data
Sep. 25, 2017 (JP) .............................. JP2017-183843

(51) Int. Cl.
*H01Q 21/24* (2006.01)
*H01B 7/04* (2006.01)
(Continued)

(52) U.S. Cl.
CPC .............. *H01Q 21/245* (2013.01); *H01Q 3/34* (2013.01); *H01Q 21/20* (2013.01); *H04B 7/0469* (2013.01); *H04B 7/0697* (2013.01)

(58) Field of Classification Search
CPC ...... H01Q 21/20; H01Q 21/245; H01Q 21/28; H01Q 3/34; H01Q 21/24; H04B 7/0456;
(Continued)

(56) References Cited

U.S. PATENT DOCUMENTS 9,692,139 B2 * 6/2017 Kowalevicz ........... H01Q 21/20
10,205,591 B2 * 2/2019 Djordjevic ............... H01Q 3/26
(Continued)

FOREIGN PATENT DOCUMENTS

CN    106130655 A    11/2016
EP    3163766 A1    5/2017

OTHER PUBLICATIONS

J. Wang et al., "Terabit free-space data transmission employing orbital angular momentum multiplexing", Nature Photonics, vol. 6, pp. 488-pp. 496, Jul. 2012.
(Continued)

*Primary Examiner* — Tho G Phan
(74) *Attorney, Agent, or Firm* — Harness, Dickey & Pierce, P.L.C.

(57) ABSTRACT

In an OAM multiplexing communication system in which an M-UCA is provided in each of a transmitting station and a receiving station, signals in a plurality of OAM modes are generated and transmitted from each UCA of the transmitting station, signals in the plurality of OAM modes are received and demultiplexed by each UCA of the transmitting station, and streams of the number of UCAs×the number of OAM modes are subjected to spatial multiplex transmission, in which the transmitting station includes a signal processing unit generating the streams to be transmitted in the plurality
(Continued)

of OAM modes from each of the UCAs of the M-UCA, and the receiving station includes a signal processing unit receiving the signals in the plurality of OAM modes demultiplexed by each of the UCAs of the M-UCA, and demultiplexes the received signals for each stream from signals in an identical OAM mode.

9 Claims, 10 Drawing Sheets

(51) Int. Cl.
  *H01Q 3/34* (2006.01)
  *H01Q 21/20* (2006.01)
  *H04B 7/0456* (2017.01)
  *H04B 7/06* (2006.01)

(58) Field of Classification Search
  CPC ...... H04B 7/0469; H04B 7/0697; H04B 7/04; H04B 7/06; H04J 11/00
  See application file for complete search history.

(56) References Cited

U.S. PATENT DOCUMENTS

| | | | | |
|---|---|---|---|---|
| 10,305,560 | B2* | 5/2019 | Adachi | H01Q 25/007 |
| 10,511,092 | B2* | 12/2019 | Sajuyigbe | H01Q 15/0086 |
| 10,873,376 | B2* | 12/2020 | Lee | H04L 27/2602 |
| 11,139,867 | B2* | 10/2021 | Sasaki | H04B 7/0417 |
| 2020/0388935 | A1* | 12/2020 | Lee | H04L 27/2628 |
| 2021/0028560 | A1* | 1/2021 | Zenkyu | H01Q 21/245 |

OTHER PUBLICATIONS

Y. Yan et al., "High-capacity millimetre-wave communications with orbital angular momentum multiplexing", Nature Communications, 5:4876, Sep. 16, 2014.

Ren, Yongxiong et al., "Experimental Demonstration of 16 Gbit/s millimeter-wave Communications using MIMO Processing of 2 OAM Modes on Each of Two Transmitter/Receiver Antenna Apertures", Globecom 2014—Wireless Communications Symposium, Dec. 12, 2014.

Opare, Kwasi A. et al., "Performance of an Ideal Wireless Orbital Angular Momentum Communication System Using Multiple-input Multiple-output Techniques", 2014 International Conference on Telecommunications and Multimedia (TEMU), Jun. 30, 2014.

Edfors, Ove et al., "Is Orbital Angular Momentum (OAM) Based Radio Communication an Unexploited Area?", IEEE Transactions on Antennas and Propagation, vol. 60, issue: 2, Feb. 2012, pp. 1126-1131.

Ren, Yongxiong et al., "Demonstration of OAM-based MIMO FSO link using spatial diversity and MIMO equalization for turbulence mitigation", 2016 Optical Fiber Communications Conference and Exhibition (OFC), Mar. 24, 2016.

Opare, Kwasi A. et al., "Mode Combination in an Ideal Wireless OAM-MIMO Multiplexing System", IEEE Wireless Communications Letters, vol. 4, issue: 4, Aug. 2015, pp. 449-452.

International Search Report (English and Japanese) issued in PCT/JP2018/035536, dated Dec. 18, 2018; ISA/JP.

* cited by examiner

FIG. 2

(1) M-UCA OF TRANSMISSION DEVICE

|       | OAM MODE 0 | OAM MODE 1 | OAM MODE −1 |
|-------|------------|------------|-------------|
| UCA 1 | STREAM 1   | STREAM 5   | STREAM 9    |
| UCA 2 | STREAM 2   | STREAM 6   | STREAM 10   |
| UCA 3 | STREAM 3   | STREAM 7   | STREAM 11   |
| UCA 4 | STREAM 4   | STREAM 8   | STREAM 12   |

(2) M-UCA OF RECEPTION DEVICE

|       | OAM MODE 0                | OAM MODE 1                | OAM MODE −1                      |
|-------|---------------------------|---------------------------|----------------------------------|
| UCA 1 | MIXED STREAM 1, 2, 3, 4   | MIXED STREAM 5, 6, 7, 8   | MIXED STREAM 9, 10, 11, 12       |
| UCA 2 | MIXED STREAM 1, 2, 3, 4   | MIXED STREAM 5, 6, 7, 8   | MIXED STREAM 9, 10, 11, 12       |
| UCA 3 | MIXED STREAM 1, 2, 3, 4   | MIXED STREAM 5, 6, 7, 8   | MIXED STREAM 9, 10, 11, 12       |
| UCA 4 | MIXED STREAM 1, 2, 3, 4   | MIXED STREAM 5, 6, 7, 8   | MIXED STREAM 9, 10, 11, 12       |

FIG. 5

| UCA | OAM | POLARIZATION | | | | | | | | | OAM MODE DEMULTIPLEXING | STREAM DEMULTIPLEXING | DEMODULATION |
|---|---|---|---|---|---|---|---|---|---|---|---|---|---|
| 1 | 0 | 0 | | | | | | | | 1 | (0, 1, 1, 0) | 0 | 0 |
| 2 | 0 | 1 | | | | | | | | | | 1 | 1 |
| 3 | 0 | 1 | | | | | | | | | | 1 | 1 |
| 4 | 0 | 0 | | | | | | | | | | 0 | 0 |
| 1 | 1 | | | | 0 | | | | 1 | | (1, –, –, 1) | 1 | 01 |
| 2 | 1 | | 1 | | | | | | | | | | |
| 3 | 1 | | 1 | | | | | | | | | | |
| 4 | 1 | | | 0 | | | | | 1 | | | 1 | |
| 1 | –1 | | | | | 1 | 0 | | | | (–, 0, 1, –) | 0 | 01 |
| 2 | –1 | | | | | | | 1 | | | | 1 | |
| 3 | –1 | | | | | | | | | | | | 10 |
| 4 | –1 | | | | | | | | | | | | 11 |
| STREAM | | | 1 | 2 | 3 | 4 | 5 | 6 | 7 | 8 | | | |

SPATIAL MODULATION A :

0 : OAM MODE 1

1 : OAM MODE –1

FIG. 6

| UCA | OAM | POLARI-ZATION | 0 | 1 | 1 | 0 | 0 | 1 | 1 | 0 | 1 | 1 | 0 | 1 | | OAM MODE DEMULTIPLEXING | STREAM DEMULTIPLEXING | DEMODULA-TION |
|---|---|---|---|---|---|---|---|---|---|---|---|---|---|---|---|---|---|---|
| 1 | 0 | V | 0 | 1 | | | | | | | | | | | | (1, −, 1) | 1 | 01 |
| 2 | 0 | V | | | | | | | | | | | | | | | | |
| 3 | 0 | V | | | | | | | | | | | | | | | | |
| 1 | 0 | H | | | | | 0 | 1 | | | | | | | | (−, 0, −) | 1 | 01 |
| 2 | 0 | H | | | 1 | 0 | | | | | | | | | | | | |
| 3 | 0 | H | | | | | | | | | | | | | | | | |
| 1 | 1 | V | | | | | | | | | | | | | | (−, −, 1) | 0 | 10 |
| 2 | 1 | V | | | | | | | | | 1 | 0 | | | | | | |
| 3 | 1 | V | | | | | | | | | | | | | | | | |
| 1 | 1 | H | | | | | | | | | | | | | 1 | (0, 1, −) | 1 | 01 |
| 2 | 1 | H | | | | | | | | | | | 1 | 1 | | | 0 | 10 |
| 3 | 1 | H | | | | | | | | | | | | | | | 1 | 11 |
| STREAM | | | 1 | | 2 | | 3 | | 4 | | 5 | | 6 | | | | |

SPATIAL MODULATION B :
0 : V POLARIZATION
1 : H POLARIZATION

F I G. 7

| UCA | OAM | POLARI-ZATION | | | | | | | | | OAM MODE DEMULTIPLEXING | STREAM DEMULTIPLEXING | DEMODULATION |
|---|---|---|---|---|---|---|---|---|---|---|---|---|---|
| 1 | 1 | V | 0 | 1 | 1 | 0 | 0 | 1 | 1 | 0 | (−, 1, −, −) | 1 | 001 |
| 2 | 1 | V | | | | | 0 | 0 | 1 | | | | |
| 3 | 1 | V | | | | | | | | | | | |
| 4 | 1 | V | | | | | | | | 1 | | | |
| 1 | 1 | H | 0 | 1 | | | | | | | (1, −, −, −) | 1 | 011 |
| 2 | 1 | H | | 1 | | | | | | | | | |
| 3 | 1 | H | | | | | | | | | | | |
| 4 | 1 | H | | | | | | | | | | | |
| 1 | −1 | V | | | | | | | | | (−, −, 1, 1) | 1 | 101 |
| 2 | −1 | V | | | | | | | | | | 1 | 101 |
| 3 | −1 | V | | | | 1 | 0 | 1 | | | | | |
| 4 | −1 | V | | | | | | | 1 | 0 | | | |
| 1 | −1 | H | | | | | | | | | (−, −, −, −) | | |
| 2 | −1 | H | | | | | | | | | | | |
| 3 | −1 | H | | | | | | | | | | | |
| 4 | −1 | H | | | | | | | | | | | |
| STREAM | | | 1 | | 2 | | 3 | | 4 | | | | |

SPATIAL MODULATION C :
0 0 : OAM MODE 1 , V POLARIZATION
0 1 : OAM MODE 1 , H POLARIZATION
1 0 : OAM MODE −1, V POLARIZATION
1 1 : OAM MODE −1, H POLARIZATION

FIG. 8
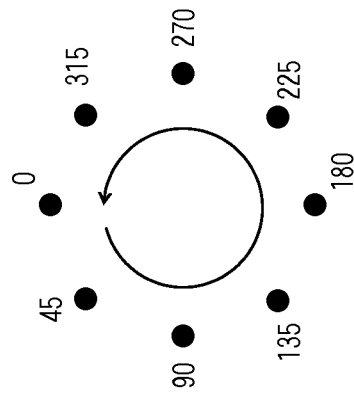
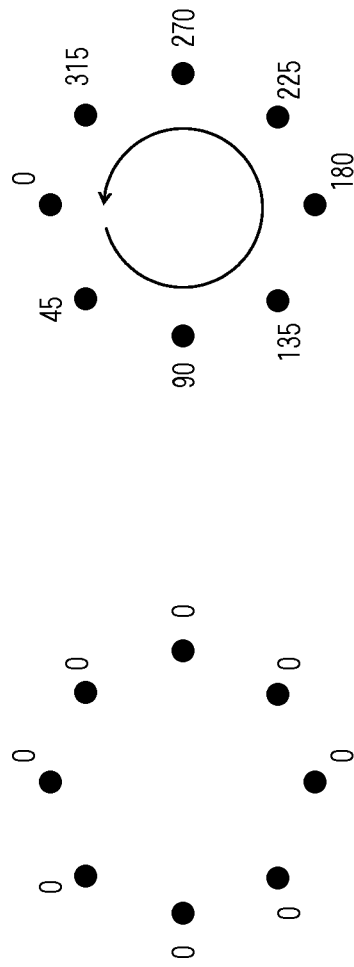
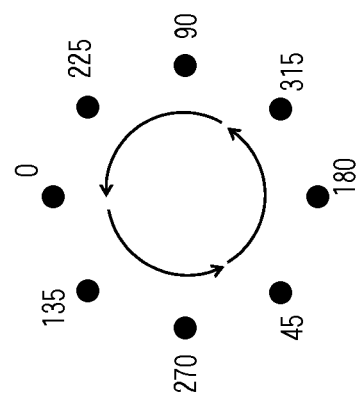
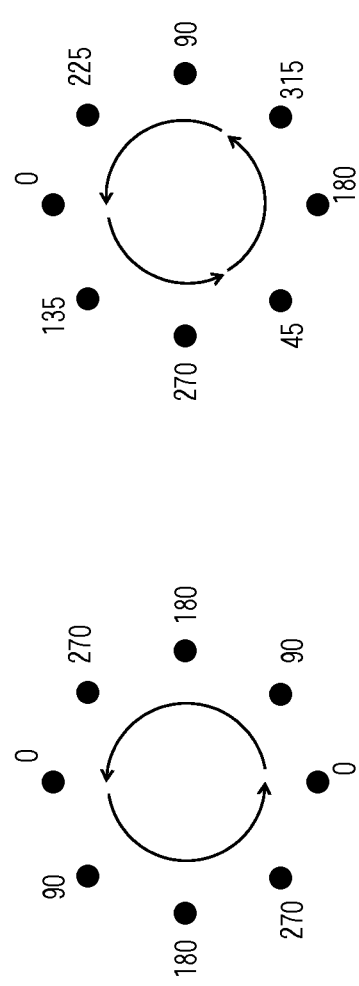

FIG. 9
(1) OAM MODE 1
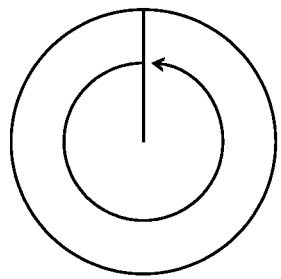
1 ROTATION (360°)
(2) OAM MODE 2
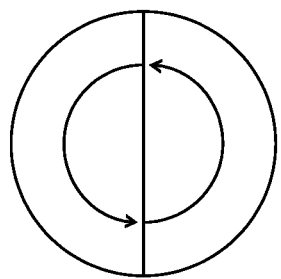
2 ROTATIONS (720°)
(3)
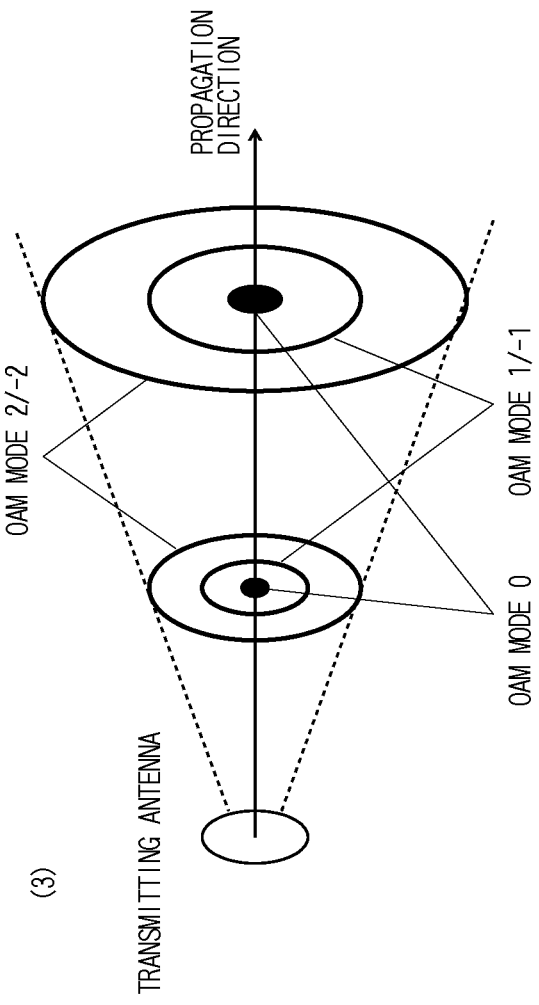

FIG. 10
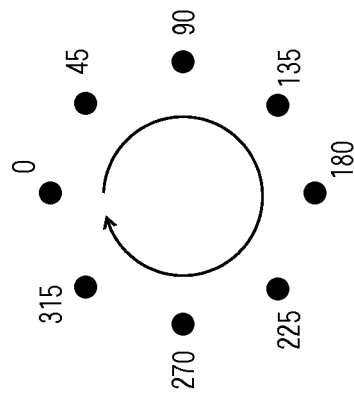
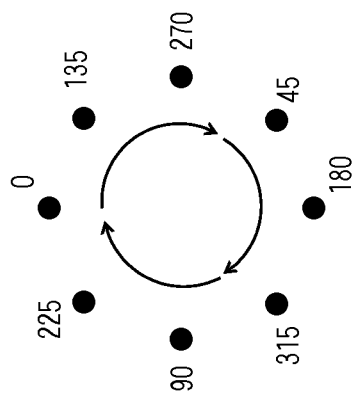
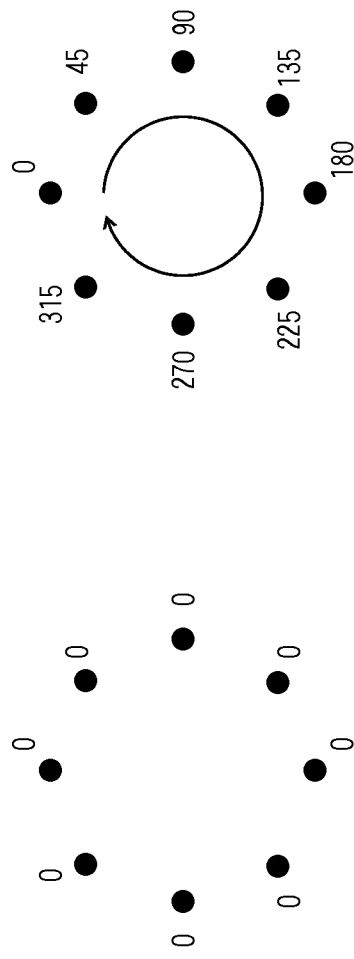
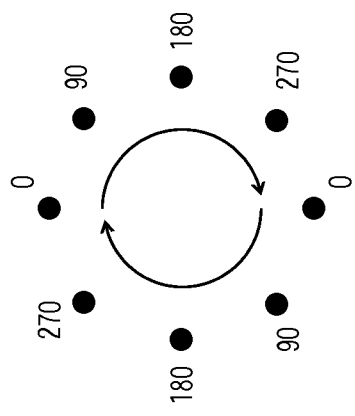

OAM MULTIPLEXING COMMUNICATION SYSTEM AND OAM MULTIPLEXING COMMUNICATION METHOD

CROSS REFERENCE TO RELATED APPLICATION

This application is a U.S. National Stage application claiming the benefit of prior filed International Application Number PCT/JP2018/035536, filed on Sep. 25, 2018, in which the International Application claims priority from Japanese Patent Application Number 2017-183843, filed on Sep. 25, 2017, the entire contents of which are incorporated herein by reference.

TECHNICAL FIELD

The present invention relates to an OAM multiplexing communication system and an OAM multiplexing communication method of subjecting a radio signal to spatial multiplex transmission by using orbital angular momentum (OAM) of an electromagnetic wave.

BACKGROUND ART

In recent years, in order to improve a transmission capacity, a spatial multiplex transmission technique for a radio signal using OAM has been reported (Non-Patent Document 1). In an electromagnetic wave having OAM, an equiphase surface thereof is distributed in a spiral form along a propagation direction centering a propagation axis. Since electromagnetic waves in different OAM modes and propagating in the same direction have spatial phase distributions orthogonal to each other, respective signals in OAM modes modulated with different signal sequences are demultiplexed in a receiving station, and thus the signals can be subjected to multiplex transmission.

In a wireless communication system using the OAM multiplexing technique, a plurality of OAM modes are generated and combined with each other by using a uniform circular array (UCA) in which a plurality of antenna elements are disposed circularly at an equal interval, to be transmitted, and thus spatial multiplex transmission of different signal sequences is performed (Non-Patent Document 2).

FIG. 8 illustrates a phase setting example of a UCA for generating a signal in an OAM mode. In FIG. 8, signals in OAM modes 0, 1, 2, 3, . . . on a transmission side are generated based on phase differences among antenna elements (indicated by ●) of the UCA. In other words, a signal in an OAM mode n is generated by setting a phase of each antenna element such that a phase of the UCA is n rotations (n×360 degrees). For example, if a UCA including eight antenna elements generates a signal in the OAM mode 2, as illustrated in (3) of FIG. 8, a phase difference of 90 degrees is set among the antenna elements counterclockwise such that a phase is two rotations. A signal rotated reversely to a signal in the OAM mode n is in an OAM mode −n. For example, a rotational direction of a phase of a signal in a positive OAM mode is a counterclockwise direction, and a rotational direction of a phase of a signal in a negative OAM mode is a clockwise direction.

Different signal sequences are generated as signals in different OAM modes, and the generated signals are simultaneously transmitted such that wireless communication using spatial multiplex can be performed. On a transmission side, signals to be transmitted in respective OAM modes are generated and combined in advance, the combined signals in the respective OAM modes may be transmitted from a single UCA, and signals in respective OAM modes may be transmitted from different UCAs for the respective OAM modes by using a plurality of UCAs.

FIG. 9 illustrates examples of a phase distribution and a signal intensity distribution of an OAM multiplexing signal. In (1) and (2) of FIG. 9, phase distributions of signals in the OAM mode 1 and the OAM mode 2, viewed at an end surface (propagation orthogonal plane) orthogonal to a propagation direction from a transmission side, are indicated by arrows. A start point of the arrow is 0 degrees, a phase linearly changes, and an end point of the arrow is 360 degrees. In other words, a signal in the OAM mode n propagates while a phase thereof is n rotations (n×360 degrees) on the propagation.

Signals in respective OAM modes are different in terms of a signal intensity distribution and a position where a signal intensity is the maximum for each OAM mode. Specifically, as an OAM mode becomes a higher-order mode, a position where a signal intensity is the maximum becomes more distant from the propagation axis (Non-Patent Document 2). Here, an OAM mode with a greater value will be referred to as a higher-order mode. For example, a signal in the OAM mode 3 is a signal in a higher-order mode than signals in the OAM mode 0, the OAM mode 1, and the OAM mode 2.

In (3) of FIG. 9, a position where a signal intensity is the maximum for each OAM mode is indicated by a circular ring, but, as an OAM mode becomes a higher-order mode, the position where the signal intensity is the maximum becomes more distant from the central axis, and a beam diameter of an OAM mode multiplex signal increases according to a propagation distance such that the circular ring indicating the position where the signal intensity is the maximum for each OAM mode becomes large.

FIG. 10 illustrates a phase setting example of a UCA for demultiplexing an OAM multiplexing signal. In FIG. 10, on a reception side, a phase of each antenna element of the UCA is set to be reverse to a phase of an antenna element on a transmission side, and a signal in each OAM mode is demultiplexed. In other words, phases of the respective antenna elements are set to rotate reversely to the case illustrated in FIG. 8. For example, when a signal in the OAM mode 2 is demultiplexed, a phase difference of 90 degrees is set among the respective antenna elements clockwise such that a phase is two rotations.

Regarding the demultiplexing process on the reception side, signals in respective OAM modes may be collectively received by using a single UCA and are then demultiplexed, and a signal in an OAM mode different for each UCA may be demultiplexed and received by using a plurality of UCAs.

Non-Patent Document 1: J. Wang et al., "Terabit free-space data transmission employing orbital angular momentum multiplexing", Nature Photonics, Vol. 6, pp. 488 to 496, July 2012.

Non-Patent Document 2: Y. Yan et al., "High-capacity millimetre-wave communications with orbital angular momentum multiplexing", Nature Communications, vol. 5, p. 4876, September 2014.

DISCLOSURE

Problems to be Solved

Problem 1

In a multiplex transmission technique using a planar array antenna (hereinafter, a multi input multi output (MIMO)

technique of the related art), all transmissions subjected to multiplex transmission have characteristics corresponding to the OAM mode 0.

Therefore, in the MIMO technique of the related art, there is no problem that reception power is reduced as an OAM mode becomes a higher-order mode, which is a problem in an OAM multiplexing transmission technique, but there is the problem 1 that a digital signal processing amount increases due to an increase in a multiplex number in order to perform demultiplex processes of all multiplexed signals. When the demultiplex processes are performed according to a zero forcing (ZF) or minimum mean square error (MMSE) equalization process of the related art, a necessary signal processing amount increases in proportion to the cube of a multiplex number. Thus, when there is a restriction in an available signal processing amount due to restricted functions of transmission and receiving stations, for example, there is a restriction in the number of computations or the like that can be performed per second, a multiplex number is restricted.

Problem 2

In the OAM multiplexing transmission technique, since respective OAM modes are orthogonal to each other, there is an advantage in that a digital signal processing amount required to demultiplex a signal in each OAM mode is reduced, but reception power varies depending on an OAM mode, and, for example, there is the problem 2 that reception power in a higher-order OAM mode is reduced.

Problem 3

In the OAM multiplexing transmission technique and the MIMO technique of the related art, reception power is reduced according to an increase in a transmission distance. When reception power is reduced, it is necessary to reduce a multiplex number to be transmitted in order to satisfy a desired reception power value on a reception side. For example, even though desired reception power is satisfied at a multiplex number of 12 when a transmission distance is 0 m to 40 m, a multiplex number may be required to be reduced to 8 when a transmission distance is 40 m to 70 m. In addition, a multiplex number may be required to be further reduced to 4 when a transmission distance is 70 m to 100 m. As mentioned above, there is the problem 3 that a multiplex number is reduced due to an increase in a transmission distance, and thus a transmission capacity is reduced.

Problem 4

On the other hand, there is the examination of a method of calculating and operating one or more eigenmodes in a diameter direction dimension for each OAM mode in addition to an OAM mode having orthogonality in a circumferential direction dimension in a polar coordinate system by using a multi (M)-UCA in which a plurality of UCAs are concentrically disposed.

A proposition of the present invention is to provide an OAM multiplexing communication system and an OAM multiplexing communication method capable of improving a transmission capacity by increasing a multiplex number while minimizing a signal processing amount required for signal demultiplexing and also of minimizing a reduction of a multiplex number and a transmission capacity due to an increase in a transmission distance, in a wireless communication system performing spatial multiplex transmission by using an M-UCA.

Means for Solving the Problems

According to a first embodiment, there is provided an OAM multiplexing communication system in which an M-UCA formed of a plurality of UCAs that are concentrically disposed is provided in each of a transmitting station and a receiving station, each of the UCAs having a plurality of antenna elements disposed circularly at an equal interval; signals in a plurality of OAM modes are generated and transmitted from each of the UCAs of the transmitting station; signals in the plurality of OAM modes are received and demultiplexed by each of the UCAs of the receiving station; and streams of the number of UCAs×the number of OAM modes are subjected to spatial multiplex transmission, in which the transmitting station includes a signal processing unit that generates the streams of the number of UCAs×the number of OAM modes to be transmitted in the plurality of OAM modes from each of the plurality of the UCAs of the M-UCA; and the receiving station includes a signal processing unit that receives the signals in the plurality of the OAM modes demultiplexed by each of the plurality of the UCAs of the M-UCA, and demultiplexes the received signals for each of the streams from signals in an identical OAM mode.

According to a second embodiment, in the OAM multiplexing communication system of the first embodiment, each of the UCAs of the M-UCAs of the transmitting station and the receiving station are configured to transmit and receive signals of two polarizations independently from each other; and the signal processing units of the transmitting station and the receiving station are configured to generate and demultiplex streams corresponding to the two polarizations.

According to a third embodiment, in the OAM multiplexing communication system of the first embodiment, the signal processing unit of the transmitting station is configured to generate the streams by using the plurality of UCAs with the plurality of OAM modes on a one-to-one basis; and the signal processing unit of the receiving station demultiplexes streams corresponding to the plurality of the UCAs from the signals in the identical OAM mode.

According to a fourth embodiment, in the OAM multiplexing communication system of the first or second embodiment, the signal processing unit of the transmitting station is configured to perform spatial modulation A of selecting one of a pair of OAM modes in which subsequent bit is transmitted according to 0 and 1 of a first bit, and to generate a stream in which the subsequent bit is transmitted in the selected OAM mode; and the signal processing unit of the receiving station is configured to demultiplex streams corresponding to the plurality of the UCAs from signals in the pair of OAM modes, and to add the first bit used in the spatial modulation A to the demultiplexed streams such that signals are demodulated for each of the streams.

According to a fifth embodiment, in the OAM multiplexing communication system of the second embodiment, the signal processing unit of the transmitting station is configured to perform spatial modulation B of selecting one of the two polarizations in which subsequent bit is transmitted according to 0 and 1 of a first bit, and to generate a stream in which the subsequent bit is transmitted in the selected polarization; and the signal processing unit of the receiving station is configured to demultiplex streams corresponding to the plurality of the UCAs from signals in the two polarizations in each of the OAM modes, and to add the first bit used in the spatial modulation B to the demultiplexed streams such that signals are demodulated for each of the streams.

According to a sixth embodiment, in the OAM multiplexing communication system of the second embodiment, the signal processing unit of the transmitting station is configured to perform spatial modulation C of selecting one of a pair of OAM modes and one of the two polarizations in which subsequent bits are transmitted according to 00, 01, 10, and 11 of a first and a second bits, and to generate a stream in which the subsequent bits are transmitted in the selected OAM mode and the selected polarization; and the signal processing unit of the receiving station is configured to demultiplex streams corresponding to the plurality of the UCAs from signals in the pair of OAM modes and the two polarizations, and to add the first and second bits used in the spatial modulation C to the demultiplexed streams such that signals are demodulated for each of the streams.

According to a seventh embodiment, in the OAM multiplexing communication system of the second embodiment, the signal processing units of the transmitting station and the receiving station are configured to reduce the number of streams subjected to the spatial multiplex transmission by using the spatial modulation A of the fourth embodiment, the spatial modulation B of the fifth embodiment, or the spatial modulation C of the sixth embodiment, according to an increase in a distance between the transmitting station and the receiving station.

According to an eighth embodiment, there is provided an OAM multiplexing communication method in which an M-UCA formed of a plurality of UCAs that are concentrically disposed is provided in each of a transmitting station and a receiving station, each of the UCAs having a plurality of antenna elements disposed circularly at an equal interval; signals in a plurality of OAM modes are generated and transmitted from each of the UCAs of the transmitting station, signals in the plurality of OAM modes are received and demultiplexed by each of the UCAs of the receiving station; and streams of the number of UCAs×the number of OAM modes are subjected to spatial multiplex transmission, in which the transmitting station has a signal processing step generating the streams of the number of UCAs×the number of OAM modes to be transmitted in the plurality of OAM modes from each of the plurality of the UCAs of the M-UCA; and the receiving station has a signal processing step receiving the signals in the plurality of the OAM modes demultiplexed by each of the plurality of the UCAs of the M-UCA, and demultiplexing the received signals for each of the streams from signals in an identical OAM mode.

According to a ninth embodiment, in the OAM multiplexing communication method of the eighth embodiment, each of the UCAs of the M-UCAs of the transmitting station and the receiving station transmit and receive signals of two polarizations independently from each other; and in the signal processing steps of the transmitting station and the receiving station, streams corresponding to the two polarizations are generated and demultiplexed.

Effect

According to the present invention, it is possible to minimize a signal processing amount required to demultiplex signals in an identical OAM mode received by each UCA, and also to improve a transmission capacity by increasing a multiplex number (the number of streams) and further to minimize, through spatial modulation, a reduction in a transmission capacity due to a decrease of a multiplex number according to an increase in a transmission distance.

BRIEF DESCRIPTION OF THE DRAWINGS

FIG. 2 is a diagram illustrating a relationship between an M-UCA of a transmitting station and an M-UCA of a receiving station.

FIG. 5 is a diagram illustrating a spatial multiplex transmission example using eight streams.

FIG. 6 is a diagram illustrating a spatial multiplex transmission example using six streams.

FIG. 7 is a diagram illustrating a spatial multiplex transmission example using four streams.

FIG. 8 a diagram illustrating a phase setting example of a UCA for generating a signal in an OAM mode.

FIG. 9 a diagram illustrating examples of a phase distribution and a signal intensity distribution of an OAM multiplexing signal.

FIG. 10 a diagram illustrating a phase setting example of a UCA for demultiplexing an OAM multiplexing signal.

DETAILED DESCRIPTION OF THE EMBODIMENTS

Figure 1:
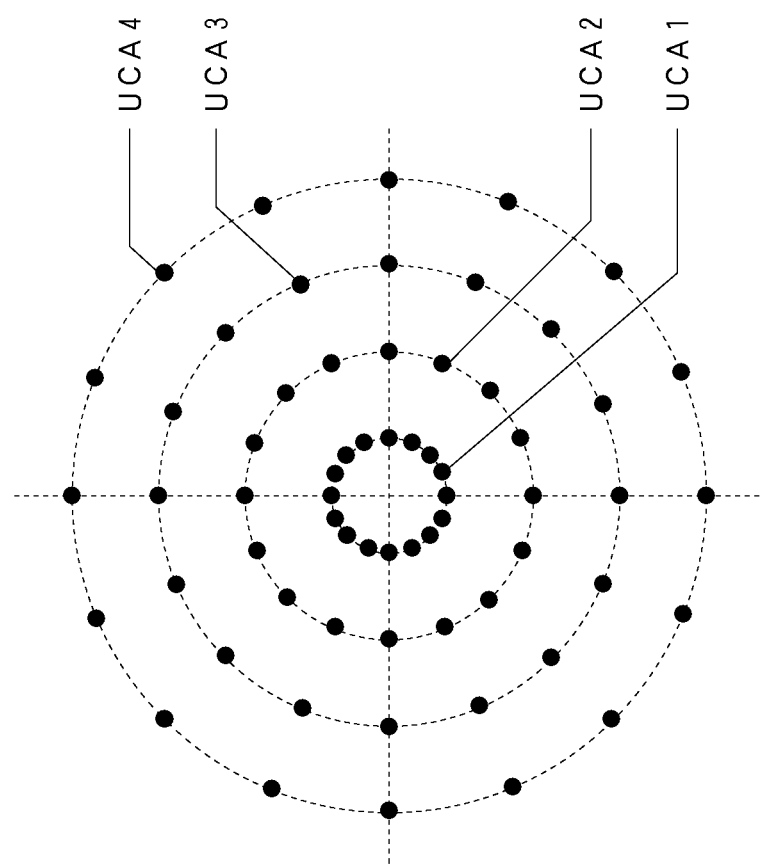
FIG. 1 is a diagram illustrating a configuration example of an M-UCA of an OAM multiplexing communication system of the present invention.

FIG. 1 is a diagram illustrating a configuration example of an M-UCA of an OAM multiplexing communication system of the present invention. In FIG. 1, the M-UCA has a configuration in which a plurality of UCAs are disposed concentrically. Herein, a configuration in which four UCAs having radii different from each other are disposed is illustrated, and the UCAs are referred to as a first UCA, a second UCA, a third UCA, and a fourth UCA in this order from the inner UCAs. As an example, each UCA includes 16 antenna elements (indicated by ● in FIG. 1), but the number of antenna elements of each UCA is not necessarily required to be the same.

Each of m UCAs forming the M-UCA generates signals in n OAM modes, and the m UCAs simultaneously transmit the signals such that m×n pieces of time-series data (stream) can be spatially multiplexed and transmitted. By using two different polarizations (a V polarized wave and an H polarized wave), a double transmission capacity can be realized. In this case, antenna elements forming the M-UCA may be configured to transmit and receive V polarizations and H polarizations. Antenna elements for V polarizations and H polarizations may be provided in parallel to each other.

For simplification of the following description, the number of UCAs of an M-UCA and the number of antenna elements of each UCA are configured to be the same between a transmitting station and a receiving station. However, when the numbers are different therebetween, the number of OAM modes is restricted to a smaller number of antenna elements, and the number of streams is restricted to a smaller number of UCAs.

For example, when the M-UCA of a transmission side includes four UCAs such as a UCA 1, a UCA 2, a UCA 3, and a UCA 4, and each UCA generates signals in the OAM modes 0, 1, and −1, twelve different streams may be simultaneously transmitted as illustrated in (1) of FIG. 2. Signals in the OAM mode 0 transmitted by the UCA 1 to the UCA 4 will be referred to as streams 1 to 4, signals in the OAM mode 1 transmitted thereby will be referred to as streams 5 to 8, and signals in the OAM mode −1 transmitted thereby will be referred to as streams 9 to 12.

The M-UCA of a reception side also includes four UCAs such as a UCA 1 to a UCA 4, and each UCA demultiplexes signals in the OAM modes 0, 1, and −1. However, each UCA can demultiplex signals in different OAM modes but cannot demultiplex signals in an identical OAM mode. Thus, as illustrated in (2) of FIG. 2, for example, the streams 1, 2, 3, and 4 transmitted in the OAM mode 0 from the UCA 1 to the UCA 4 of the transmission side are mixed in signals from which the OAM mode 0 is demultiplexed by the UCA 1 and are received. Therefore, it is necessary to demultiplex each of the streams 1, 2, 3, and 4 from the signals in which the streams in the OAM mode 0 demultiplexed by the UCA 1 are mixed. This is also the same for the UCA2 to UCA 4, and is also the same for the OAM modes 1 and −1.

As mentioned above, the receiving station of the OAM multiplexing communication system of the present invention uses an OAM mode demultiplex unit that first demultiplexes the OAM modes 0, 1, and −1 for each of the UCA 1 to the UCA 4, and a signal processing unit that demultiplexes each stream in an identical OAM mode.

A demultiplex process of each stream in an identical OAM mode in the signal processing unit may be performed by performing channel estimation by using a known signal transmitted from the transmission side and by performing an equalization process using a result of the channel estimation.

When preprocessing (precoding) is performed on a signal in each OAM mode by using channel information on the transmission side such that an eigenbeam is generated, a demultiplex process of each stream can be performed even though an equalization process is not performed on the reception side.

Here, the channel information may be fed back from the reception side via separate transmission and reception systems so as to be collected. In an open environment, channel information may be computed according to a theoretical expression regarding propagation characteristics of an OAM beam, and a computation result thereof may be used. For example, in an open environment, channel information between respective antenna elements of transmission and reception M-UCAs may be computed by using distance information between transmitting and receiving antennae, acquired from separate means such as GPS information, and channel information of each OAM mode may be computed based on the information. Specifically, information regarding propagation attenuation and a phase may be acquired based on information regarding a wavelength of a beam computed by using a distance between respective elements of the transmitting and receiving antennae and a frequency used thereby.

Figure 3:
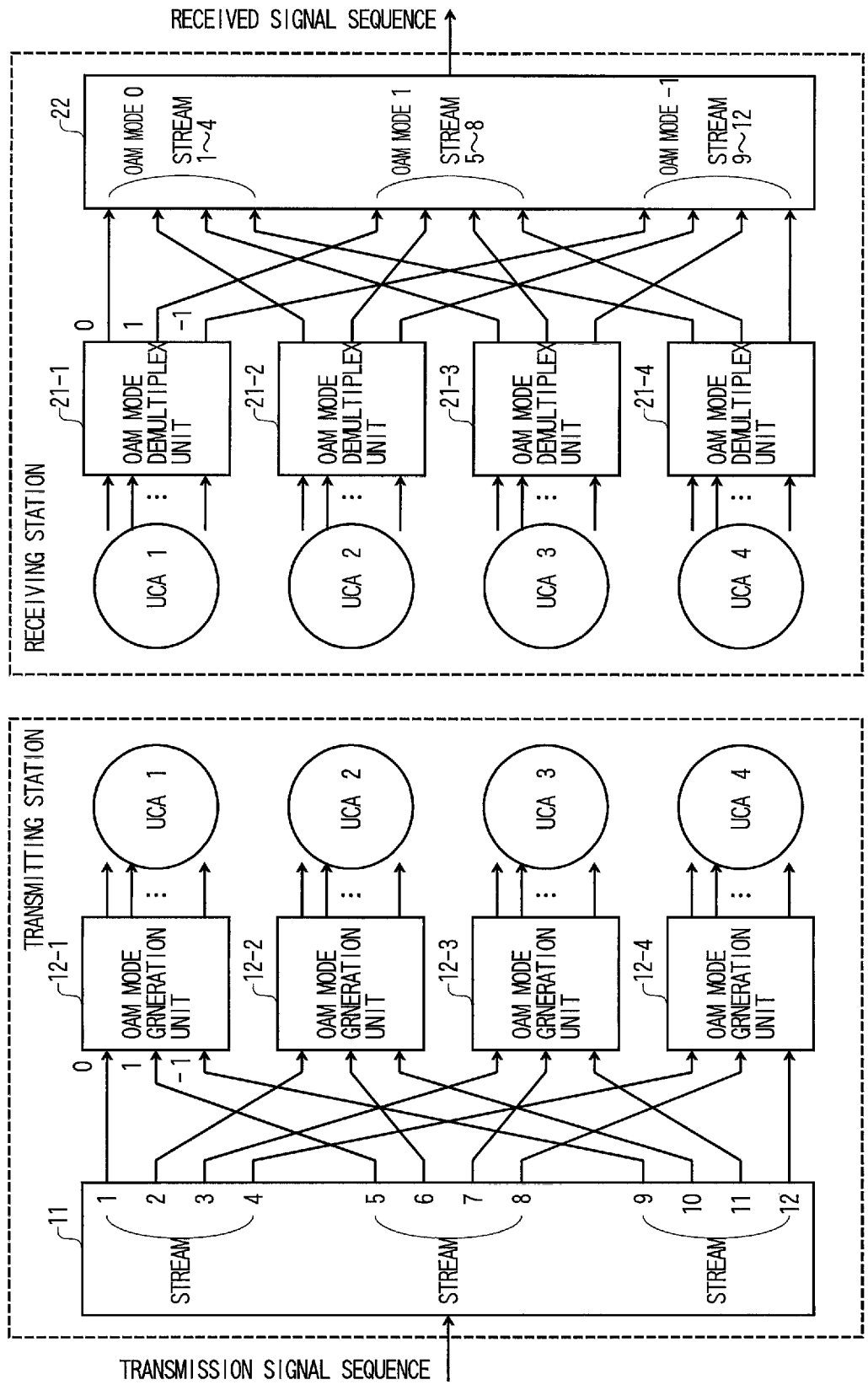
FIG. 3 is a diagram illustrating a configuration of an Example of the OAM multiplexing communication system of the present invention.

FIG. 3 illustrates a configuration of an Example of the OAM multiplexing communication system of the present invention. Herein, a configuration example of transmitting and receiving signals of the streams 1 to 12 illustrated in FIG. 2 is illustrated.

In FIG. 3, the transmitting station includes the UCA 1 to the UCA 4. A signal processing unit 11 receives a transmission signal sequence, and generates signals of the streams 1 to 12 to be transmitted in the OAM modes 0, 1, and −1 from the UCA 1 to the UCA 4. An OAM mode generation unit 12-1 receives signals of the streams 1, 5, and 9 to be transmitted in the OAM modes 0, 1, and −1 from the UCA 1. An OAM mode generation unit 12-2 receives signals of the streams 2, 6, and 10 to be transmitted in the OAM modes 0, 1, and −1 from the UCA 2. An OAM mode generation unit 12-3 receives signals of the streams 3, 7, and 11 to be transmitted in the OAM modes 0, 1, and −1 from the UCA 3. An OAM mode generation unit 12-4 receives signals of the streams 4, 8, and 12 to be transmitted in the OAM modes 0, 1, and −1 from the UCA 4. Each of the OAM mode generation units 12-1 to 12-4 adjusts phases of the received signals such that the signals are to be transmitted as signals in the OAM modes 0, 1, and −1, and inputs the signals into the antenna elements of each UCA. When two polarizations are used, there is a configuration in which signals respectively transmitted with a V polarized wave and an H polarized wave are input and output.

The receiving station includes the UCA 1 to the UCA 4. Each of OAM mode demultiplex units 21-1 to 21-4 demultiplexes signals in the OAM modes 0, 1, and −1 from signals received by each of the UCA 1 to the UCA 4. The streams 1, 2, 3, and 4 are mixed in the signals in the OAM mode 0 demultiplexed by each of the OAM mode demultiplex units 21-1 to 21-4, the streams 5, 6, 7, and 8 are mixed in the signals in the OAM mode 1, and the streams 9, 10, 11, and 12 are mixed in the signals in the OAM mode −1. A signal processing unit 22 receives the signals in the OAM modes 0, 1, and −1 demultiplexed by the OAM mode demultiplex units 21-1 to 21-4, demultiplexes the streams 1, 2, 3, and 4 from the signals in the OAM mode 0, demultiplexes the streams 5, 6, 7, and 8 from the signals in the OAM mode 1, and demultiplexes the streams 9, 10, 11, and 12 from the signals in the OAM mode −1, demodulates a signal of each stream, and outputs a received signal sequence. When two polarizations are used, there is a configuration in which signals respectively received with a V polarized wave and an H polarized wave are input and output.

Hereinafter, a description will be made of a method of subjecting 12-bit signals (011001101101) to spatial multiplex transmission by combining the four UCAs such as the UCA 1 to the UCA 4 forming the M-UCA, the OAM modes 0, 1, and −1, and polarizations. As a modulation method, BPSK providing one-symbol-one-bit modulation is used, but, QPSK providing one-symbol-two-bit modulation or 16QAM providing one-symbol-four-bit modulation may be used, but fundamental operations thereof are the same as each other.

(Spatial Multiplex Transmission Example Using Twelve Streams)

Figure 4:
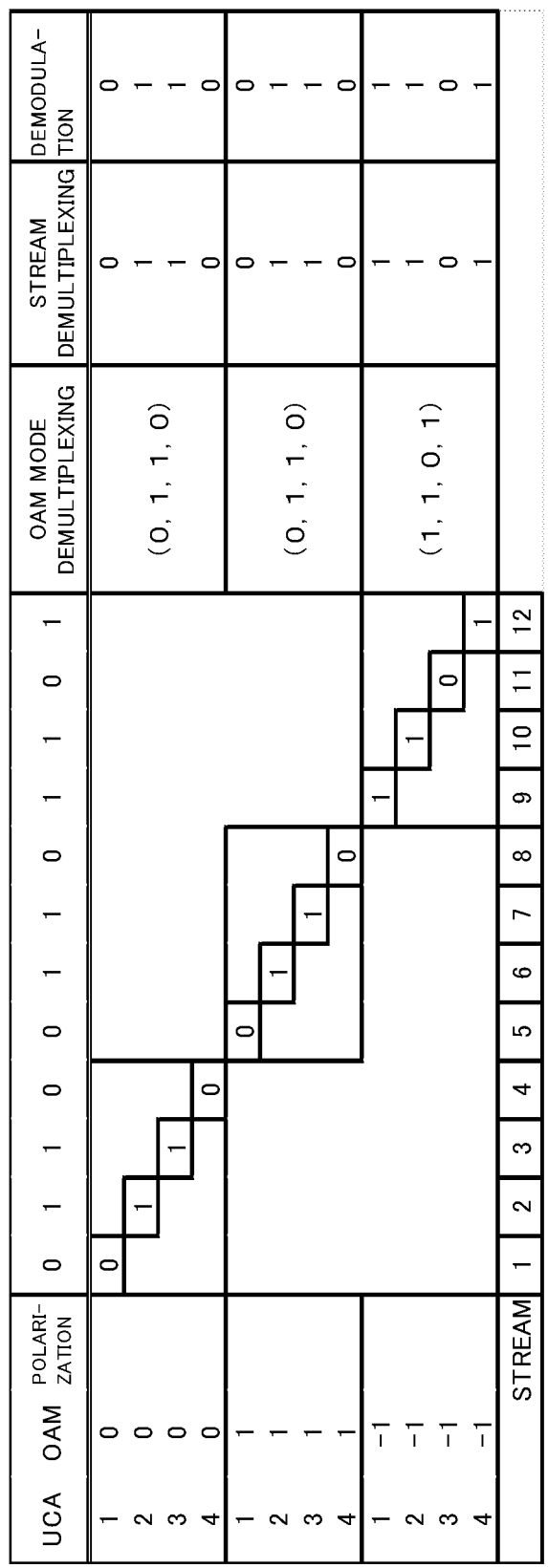
FIG. 4 is a diagram illustrating a spatial multiplex transmission example using twelve streams.

FIG. 4 is a diagram illustrating a spatial multiplex transmission example using twelve streams. Here, the UCA 1 to the UCA 4 and the OAM modes 0, 1, and −1 are used.

In FIG. 4, the signal processing unit 11 of the transmitting station generates the first 4-bit signals (0110) as the streams 1 to 4 to be transmitted in the OAM mode 0 from the UCA 1 to the UCA 4, generates the next 4-bit signals (0110) as the streams 5 to 8 to be transmitted in the OAM mode 1 from the UCA 1 to the UCA 4, and generates the next 4-bit signals (1101) as the streams 9 to 12 to be transmitted in the OAM mode −1 from the UCA 1 to the UCA 4.

The signal processing unit 22 of the receiving station receives the signals in the OAM mode 0 demultiplexed by the OAM mode demultiplex units 21-1 to 21-4 in which the signals (0110) of the streams 1 to 4 are mixed. Simultaneously, the signal processing unit receives the signals in the OAM mode 1 in which the signals (0110) of the streams 5 to 8 are mixed, and receives the signals in the OAM mode −1 in which the signals (1101) of the streams 9 to 12 are mixed. The signals 0, 1, 1, and 0 are demultiplexed for each stream from the signals (0110) in which the streams 1 to 4 received in the OAM mode 0 are mixed, so as to be demodulated. This is also the same for the OAM modes 1 and −1.

As mentioned above, the signals (011001101101) subjected to spatial multiplex transmission in the streams 1 to 12 can be demultiplexed and demodulated by using the UCA 1 to the UCA 4 and the OAM modes 0, 1, and −1.

(Spatial Multiplex Transmission Example Using Eight Streams)

FIG. 5 is a diagram illustrating a spatial multiplex transmission example using eight streams. Here, the UCA 1 to the UCA 4 and the OAM modes 0, 1, and −1 are used. In addition, spatial modulation A is used in which two bits are transmitted in one stream. In the spatial modulation A, OAM modes in which signals of the second bit are transmitted are correlated with signals 0 and 1 of the first bit as follows.

0: OAM mode 1
1: OAM mode −1

The "spatial modulation" used in the present invention may also be referred to as mode modulation, OAM mode modulation, index modulation, or OAM index modulation.

Consequently, when signals (01) are spatially modulated, the signal 1 is transmitted in the OAM mode 1, and no signal is transmitted in the OAM mode −1. When signals (11) are spatially modulated, no signal is transmitted in the OAM mode 1, and the signal 1 is transmitted in the OAM mode −1.

In FIG. 5, the signal processing unit 11 of the transmitting station generates first 4-bit signals (0110) as the streams 1 to 4 to be transmitted in the OAM mode 0 from the UCA 1 to the UCA 4, and applies the spatial modulation A to a fifth-bit and the subsequent bits. The signal of the fifth bit is 0, and thus the signal 1 of the sixth bit is generated as the stream 5 transmitted in the OAM mode 1 from the UCA 1. In this case, there is no signal transmitted in the OAM mode −1 from the UCA 1. Therefore, the stream 5 transmitted in the OAM mode 1 from the UCA 1 is a signal obtained by spatially modulating the signals (01).

Simultaneously, the signal of the seventh bit is 1, and thus the signal 0 of the eighth bit is generated as the stream 6 to be transmitted in the OAM mode −1 from the UCA 1. In this case, there is no signal transmitted in the OAM mode 1 from the UCA 2. Therefore, the stream 6 transmitted in the OAM mode −1 from the UCA 1 is a signal obtained by spatially modulating the signals (10). This is also the same for the ninth bit and the subsequent bits, and thus the streams 5 to 8 are generated by two bits from the fifth bit to the twelfth bit.

The signal processing unit 22 of the receiving station demultiplexes signals for the respective streams 1 to 4 from the signals (0110) in which the streams 1 to 4 are mixed as the signals in the OAM mode 0 demultiplexed by the OAM mode demultiplex units 21-1 to 21-4, and demodulates the streams as the signals (0110).

Simultaneously, signals are demultiplexed for each stream from the signals (1--1) in which the streams 5 to 8 are mixed as the signals in the OAM mode 1. Here, "–" indicates a state (for example, a noise level) in which there is no signal. Therefore, the signal 1 of the stream 5 and the signal 1 of the stream 8 are demultiplexed, and are demodulated as signals (01----01). The underline part indicates a demultiplexed actual signal (the same applies hereafter).

Simultaneously, signals are demultiplexed for each stream from the signals (-01-) in which the streams 5 to 8 are mixed as the signals in the OAM mode −1. Therefore, the signal 0 of the stream 6 and the signal 1 of the stream 7 are demultiplexed, and are demodulated as signals (--10̲1̲1̲--).

As mentioned above, the signals (011001101101) subjected to spatial multiplex transmission in the streams 1 to 4 and the streams 5 to 8 can be demultiplexed and demodulated by using the UCA 1 to the UCA 4, the OAM modes 0, 1, and −1, and the spatial modulation A.

(Spatial Multiplex Transmission Example Using Six Streams)

FIG. 6 is a diagram illustrating a spatial multiplex transmission example using six streams. Here, the UCA 1 to the UCA 3, the OAM modes 0 and 1, and polarization multiplex are used. In addition, spatial modulation B is used in which two bits are transmitted in one stream through polarization multiplex. In the spatial modulation B, polarizations with which signals of the second bit are transmitted are correlated with signals 0 and 1 of the first bit as follows.

0: V polarized wave
1: H polarized wave

Consequently, when the signals (01) are spatially modulated, the signal 1 is transmitted with the V polarized wave, and no signal is transmitted with the H polarized wave. When signals (11) are spatially modulated, no signal is transmitted with the V polarized wave, and the signal 1 is transmitted with the H polarized wave.

In FIG. 6, the signal of the first bit is 0, and thus the signal processing unit 11 of the transmitting station generates the signal 1 of the second bit as the stream 1 to be transmitted with the V polarized wave in the OAM mode 0 from the UCA 1. In this case, there is no signal transmitted with the H polarized wave in the OAM mode 0 from the UCA 1. Therefore, the stream 1 transmitted with the V polarized wave in the OAM mode 0 from the UCA 1 is a signal obtained by spatially modulating the signals (01).

Simultaneously, the third bit is the signal 1, and thus the signal 0 of the fourth bit is generated as the stream 2 to be transmitted with the H polarized wave in the OAM mode 0 from the UCA 2. In this case, there is no signal transmitted with the V polarized wave in the OAM mode 0 from the UCA 2. Therefore, the stream 2 transmitted with the H polarized wave in the OAM mode 0 from the UCA 2 is a signal obtained by spatially modulating the signals (10).

Simultaneously, the fifth bit is the signal 0, and thus the signal 1 of the sixth bit is generated as the stream 3 to be transmitted with the V polarized wave in the OAM mode 0 from the UCA 3. In this case, there is no signal transmitted with the H polarized wave in the OAM mode 0 from the UCA 3. Therefore, the stream 3 transmitted with the V polarized wave in the OAM mode 0 from the UCA 3 is a signal obtained by spatially modulating the signals (01).

This is also the same for the seventh bit and the subsequent bits except that the OAM mode 1 is used, and the signals of the first bit to the twelfth bit may be generated as the streams 1 to 6 by two bits.

The signal processing unit 22 of the receiving station demultiplexes signals for the respective streams from the signals (1-1) in which the streams 1 to 3 are mixed as signals corresponding to the V polarized wave in the OAM mode 0 demultiplexed by the OAM mode demultiplex units 21-1 to 21-4. Here, "–" indicates a state (for example, a noise level) in which there is no signal. Therefore, the signal 1 of the stream 1 and the signal 1 of the stream 3 are demultiplexed, and are demodulated as signals (01̲--01̲).

Simultaneously, signals are demultiplexed for the respective streams from the signals (-0-) in which the streams 1 to 3 are mixed as signals corresponding to the H polarized wave in the OAM mode 0. Therefore, the signal 0 of the stream 2 is demultiplexed, and is demodulated as signals (--1<u>0</u>--).

Simultaneously, signals are demultiplexed for the respective streams from the signals (--1) in which the streams 4 to 6 are mixed as signals corresponding to the V polarized wave in the OAM mode 1. Therefore, the signal 1 of the stream 6 is demultiplexed, and is demodulated as signals (----0<u>1</u>).

Simultaneously, signals are demultiplexed for the respective streams from the signals (01-) in which the streams 4 to 6 are mixed as signals corresponding to the H polarized wave in the OAM mode 1. Therefore, the signal 0 of the stream 4 and the signal 1 of the stream 5 are demultiplexed, and are demodulated as signals (10<u>1</u>1--).

As mentioned above, the signals (011<u>0</u>01101101) subjected to spatial multiplex transmission in the streams 1 to 6 can be demultiplexed and demodulated by using the UCA 1 to the UCA 3, the OAM modes 0 and 1, the polarization multiplex, and the spatial modulation B.

(Spatial Multiplex Transmission Example Using Four Streams)

FIG. 7 is a diagram illustrating a spatial multiplex transmission example using four streams. Here, the UCA 1 to the UCA 4, the OAM modes 1 and −1, and polarization multiplex are used. In addition, spatial modulation C is used in which three bits are transmitted in one stream by using an OAM mode and polarization multiplex. In the spatial modulation C, the OAM modes and polarizations in and with which signals of the third bit are transmitted are correlated with signals 00, 01, 10, and 11 of the first and second bits as follows.

00: OAM mode 1 and V polarized wave
01: OAM mode 1 and H polarized wave
10: OAM mode −1 and V polarized wave
11: OAM mode −1 and H polarized wave Consequently, when the signals (001) are spatially modulated, the signal 1 is transmitted with the V polarized wave in the OAM mode 1, no signal is transmitted with the H polarized wave in the OAM mode 1, and no signal is transmitted with the V/H polarized wave in the OAM mode −1.

In FIG. 7, the first and second bits are the signals (01), and thus the signal processing unit 11 of the transmitting station generates the signal 1 of the third bit as the stream 1 to be transmitted with the H polarized wave in the OAM mode 1 from the UCA 1. In this case, there are no signals transmitted with the V polarized wave in the OAM mode 1 and with the V/H polarized wave in the OAM mode −1 from the UCA 1.

Simultaneously, the fourth and fifth bits are the signals (00), and thus the signal 1 of the sixth bit is generated as the stream 2 to be transmitted with the V polarized wave in the OAM mode 1 from the UCA 2. In this case, there are no signals transmitted with the H polarized wave in the OAM mode 1 and with the V/H polarized wave in the OAM mode −1 from the UCA 2.

This is also the same for the seventh bit and the subsequent bits, and the signals of the first bit to the twelfth bit may be generated as the streams 1 to 4 by three bits.

The signal processing unit 22 of the receiving station demultiplexes signals for the respective streams from the signals (-1--) in which the streams 1 to 4 are mixed as signals corresponding to the V polarized wave in the OAM mode 1 demultiplexed by the OAM mode demultiplex units 21-1 to 21-4. Here, "–" indicates a state (for example, a noise level) in which there is no signal. Therefore, the signal 1 of the stream 2 is demultiplexed, and is demodulated as signals (---00<u>1</u>------) since the signals of the streams 1, 3, and 4 are not detected.

Simultaneously, signals are demultiplexed for the respective streams from the signals (1---) in which the streams 1 to 4 are mixed as signals corresponding to the H polarized wave in the OAM mode 1. Therefore, the signal 1 of the stream 1 is demultiplexed, and is demodulated as signals (01<u>1</u>---------) since the signals of the streams 2, 3, and 4 are not detected.

Simultaneously, signals are demultiplexed for the respective streams from the signals (--11) in which the streams 1 to 4 are mixed as signals corresponding to the V polarized wave in the OAM mode −1. Therefore, the signal 1 of the stream 3 and the signal 1 of the stream 4 are demultiplexed, and is demodulated as signals (------10<u>1</u>10<u>1</u>) since the signals of the streams 1 and 2 are not detected.

Simultaneously, signals are demultiplexed for the respective streams from the signals (----) in which the streams 1 to 4 are mixed as signals corresponding to the H polarized wave in the OAM mode −1, but there is no demultiplexed signal.

As mentioned above, the signals (011<u>0</u>01101<u>1</u>01) subjected to spatial multiplex transmission in the streams 1 to 4 can be demultiplexed and demodulated by using the UCA 1 to the UCA 4, the OAM modes 1 and −1, the polarization multiplex, and the spatial modulation C.

The above four examples are examples of patterns of subjecting 12-bit signals to spatial multiplex transmission in twelve streams, eight streams, six streams, and four streams, and there is no limitation thereto. For example, in the six streams, a description has been made of the example of using the UCA 1 to the UCA 3, the OAM modes 0 and 1, and the polarization multiplex, but a combination of 1 and −1 may be used as OAM modes. Even though the UCA 1 and the UCA 2, the OAM modes 0, 1, and −1, and the polarization multiplex are used, signals can be generated as six streams in the same manner. Other patterns may be formed by using various combinations.

In wireless multiplex communication transmission techniques including the OAM multiplexing transmission technique, propagation attenuation increases according to an increase in a transmission distance. Consequently, since a reception SNR of each stream is reduced, it is effective to reduce a multiplex number (number of streams) according to a transmission distance and to distribute transmission power in accordance with the reduced number. However, the spatial modulation of the present invention is used to minimize a reduction in a total transmission capacity even through a multiplex number is reduced.

When a multiplex number is 12, 8, 6, or 4 according to a transmission distance, the spatial modulation is applied, and thus it is possible to suppress a reduction in a total transmission capacity.

When a multiplex number is 12, 12-bit signals are subjected to spatial multiplex transmission in twelve streams by using the UCA 1 to the UCA 4 and the OAM modes 0, 1, and −1 in FIG. 4.

When a multiplex number is 8, 12-bit signals are subjected to spatial multiplex transmission in eight streams by using the UCA 1 to the UCA 4, the OAM modes 0, 1, and −1, and the spatial modulation A in which two bits are transmitted in one stream based on the OAM modes in FIG. 5.

When a multiplex number is 6, 12-bit signals are subjected to spatial multiplex transmission in six streams by using the UCA 1 to the UCA 3, the OAM modes 0 and 1, and the spatial modulation B in which two bits are transmitted in one stream based on polarization multiplex in FIG. 6.

When a multiplex number is 4, 12-bit signals are subjected to spatial multiplex transmission in four streams by using the UCA 1 to the UCA 4, the OAM modes 1 and −1, and the spatial modulation C in which three bits are transmitted in one stream based on the OAM modes and polarization multiplex in FIG. 7.

When a multiplex number is increased, this may be coped with by increasing the number of UCAs or the number of OAM modes. However, when the number of UCAs is increased, a signal processing amount required to separate an identical OAM mode is increased. When the number of OAM modes is increased, the OAM mode demultiplex unit can easily cope with this, but there is the problem 2 that reception power in a higher-order OAM mode is reduced. Therefore, regarding of the number of UCAs and the number of OAM modes, optimal values are required to be selected according to specifications.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. An OAM multiplexing communication system in which an M-UCA formed of a plurality of uniform circular arrays, hereinafter, UCAs, that are concentrically disposed is provided in each of a transmitting station and a receiving station, each of the UCAs having a plurality of antenna elements disposed circularly at an equal interval; signals in a plurality of OAM modes are generated and transmitted from each of the UCAs of the transmitting station; signals in the plurality of OAM modes are received and demultiplexed by each of the UCAs of the receiving station; and streams of the number of UCAs×the number of OAM modes are subjected to spatial multiplex transmission, wherein:
the transmitting station includes a signal processing unit that generates the streams of the number of UCAs×the number of OAM modes to be transmitted in the plurality of OAM modes from each of the plurality of the UCAs of the M-UCA; and
the receiving station includes a signal processing unit that receives the signals in the plurality of the OAM modes demultiplexed by each of the plurality of the UCAs of the M-UCA, and demultiplexes the received signals for each of the streams from signals in an identical OAM mode.

2. The OAM multiplexing communication system according to claim 1, wherein
each of the UCAs of the M-UCAs of the transmitting station and the receiving station are configured to transmit and receive signals of two polarizations independently from each other; and
the signal processing units of the transmitting station and the receiving station are configured to generate and demultiplex streams corresponding to the two polarizations.

3. The OAM multiplexing communication system according to claim 2, wherein:
the signal processing unit of the transmitting station is configured to perform spatial modulation B of selecting one of the two polarizations in which subsequent bit is transmitted according to 0 and 1 of a first bit, and to generate a stream in which the subsequent bit is transmitted in the selected polarization; and
the signal processing unit of the receiving station is configured to demultiplex streams corresponding to the plurality of the UCAs from signals in the two polarizations in each of the OAM modes, and to add the first bit used in the spatial modulation B to the demultiplexed streams such that signals are demodulated for each of the streams.

4. The OAM multiplexing communication system according to claim 2, wherein:
the signal processing unit of the transmitting station is configured to perform spatial modulation C of selecting one of a pair of OAM modes and one of the two polarizations in which subsequent bits are transmitted according to 00, 01, 10, and 11 of a first and a second bits, and to generate a stream in which the subsequent bits are transmitted in the selected OAM mode and the selected polarization; and
the signal processing unit of the receiving station is configured to demultiplex streams corresponding to the plurality of the UCAs from signals in the pair of OAM modes and the two polarizations, and to add the first and second bits used in the spatial modulation C to the demultiplexed streams such that signals are demodulated for the each of the streams.

5. The OAM multiplexing communication system according to claim 2, wherein
the signal processing units of the transmitting station and the receiving station are configured to reduce the number of streams subjected to the spatial multiplex transmission by using one of spatial modulation A of selecting one of a pair of OAM modes in which subsequent bit is transmitted according to 0 and 1 of a first bit, spatial modulation B of selecting one of the two polarizations in which subsequent bit is transmitted according to 0 and 1 of a first bit, and spatial modulation C of selecting one of a pair of OAM modes and one of the two polarizations in which subsequent bits are transmitted according to 00, 01, 10, and 11 of a first and a second bits, according to an increase in a distance between the transmitting station and the receiving station.

6. The OAM multiplexing communication system according to claim 1, wherein;
the signal processing unit of the transmitting station is configured to generate the streams by correlating the plurality of UCAs with the plurality of OAM modes on a one-to-one basis; and
the signal processing unit of the receiving station demultiplexes streams corresponding to the plurality of the UCAs from the signals in the identical OAM mode.

7. The OAM multiplexing communication system according to claim 1, wherein:
the signal processing unit of the transmitting station is configured to perform spatial modulation A of selecting one of a pair of OAM modes in which subsequent bit is transmitted according to 0 and 1 of a first bit, and to generate a stream in which the subsequent bit is transmitted in the selected OAM mode; and
the signal processing unit of the receiving station is configured to demultiplex streams corresponding to the plurality of the UCAs from signals in the pair of OAM modes, and to add the first bit used in the spatial modulation A to the demultiplexed streams such that signals are demodulated for each of the streams.

8. An OAM multiplexing communication method in which an M-UCA formed of a plurality of uniform circular arrays, hereinafter, UCAs, that are concentrically disposed is provided in each of a transmitting station and a receiving station, each of the UCAs having a plurality of antenna elements disposed circularly at an equal interval; signals in a plurality of OAM modes are generated and transmitted from each of the UCAs of the transmitting station; signals in the plurality of OAM modes are received and demultiplexed by each of the UCAs of the receiving station; and streams of the number of UCAs×the number of OAM modes are subjected to spatial multiplex transmission, wherein:

the transmitting station has a signal processing step generating the streams of the number of UCAs×the number of OAM modes to be transmitted in the plurality of OAM modes from each of the plurality of the UCAs of the M-UCA; and the receiving station has a signal processing step receiving the signals in the plurality of the OAM modes demultiplexed by each of the plurality of the UCAs of the M-UCA, and demultiplexing the received signals for each of the streams from signals in an identical OAM mode.

9. The OAM multiplexing communication method according to claim 8, wherein:

each of the UCAs of the M-UCAs of the transmitting station and the receiving station transmit and receive signals of two polarizations independently from each other; and in the signal processing steps of the transmitting station and the receiving station, streams corresponding to the two polarizations are generated and demultiplexed.

* * * * *